United States Patent [19]
Schilz et al.

[11] Patent Number: 5,366,166
[45] Date of Patent: Nov. 22, 1994

[54] MECHANICAL ALLOYING OF BRITTLE AND HARD MATERIALS BY USE OF PLANETARY MILLS

[75] Inventors: Jürgen Schilz; Marius Kürten, both of Cologne, Germany

[73] Assignee: Deutsche Forschungsanstalt für Luft- und Raumfahft e.V., Cologne, Germany

[21] Appl. No.: 173,378

[22] Filed: Dec. 23, 1993

[30] Foreign Application Priority Data

Dec. 23, 1992 [DE] Germany .................... 4243794

[51] Int. Cl.⁵ .................................................... B22F 1/00
[52] U.S. Cl. .................................. 241/30; 75/352; 419/33
[58] Field of Search ................ 241/5, 30, 22, 170, 241/175; 75/352; 419/32, 33

[56] References Cited

U.S. PATENT DOCUMENTS

| | | | |
|---|---|---|---|
| 3,201,273 | 8/1965 | Maker et al. | 241/175 X |
| 4,627,959 | 12/1986 | Gilman et al. | 241/5 X |
| 4,706,894 | 11/1987 | Rühle et al. | 241/175 X |
| 4,955,551 | 9/1990 | Jurisov | 241/175 |
| 5,039,476 | 8/1991 | Adachi et al. | 241/5 X |

FOREIGN PATENT DOCUMENTS

1431834 10/1988 U.S.S.R. .......................... 241/175

OTHER PUBLICATIONS

"Mechanical Alloying of Brittle Materials", McDermott et al.; Metallurgical Transactions A, 1988, vol. 19A, pp. 2867–2874.

"The Physics of Mechanical Alloying": A First Report; Maurice et al, Metallurgical Transactions A, 1990, vol. 21A, pp. 289–303.

"Broyeurs a Satellites", Joisel, Revue des Materiaux de Construction, No. 493, 1952.

Primary Examiner—Timothy V. Eley
Attorney, Agent, or Firm—Spensley Horn Jubas & Lubitz

[57] ABSTRACT

In a planetary mill, the ratio between the angular speed of a planetary wheel and the angular speed of the sun wheel is selected based upon the ratio between the inner radius of a grinding drum connected to the planetary wheel and the radius of the sun wheel. This arrangement enables the planetary mill to be used for mechanically alloying brittle and hard materials.

8 Claims, 2 Drawing Sheets

$$\hat{\omega} = \frac{\omega}{\Omega} = \frac{1}{3{,}29\frac{r}{R} + 0{,}202} + 1{,}368$$

MECHANICAL ALLOYING OF BRITTLE AND HARD MATERIALS BY USE OF PLANETARY MILLS

BACKGROUND OF THE INVENTION

1. Field of the Invention

The invention is directed to a method for the mechanical alloying of brittle and hard materials, a planetary mill for the mechanical alloying of brittle and hard materials and the use of a planetary mill for the mechanical alloying of brittle and hard materials.

2. Description of Related Art

The mechanical alloying of powdery or granular materials to each other has been known for a long time. For this purpose, the materials to be alloyed to each other are placed in a vessel together with preferably ball-shaped (grinding) bodies. Then, the vessel is moved in such a manner that the bodies mix and comminute the materials to be alloyed and by their impact destroy the structure of the different materials to such an extent that an alloy is formed. Thus, mechanical alloying is based on deformation of the materials to be alloyed. Originally, mechanical alloying processes were restricted to ductile materials, such as metals, whose chemical bond is largely of a metallic character. Because of their relatively easy moldability, such ductile materials can be readily alloyed in a mechanical manner, wherein the alloying process can be understood as a kneading connection. Hard and brittle materials, e.g. germanium and silicon, were alloyed for the first time in the Eighties. For alloying such hard and brittle materials, considerably more energy has to be applied than in case of ductile materials. To perform mechanical alloying, there are used so-called vibratory mills wherein the materials to be alloyed (grinding stock) along with grinding bodies are filled into a vessel which is then subjected to vibration. The articles "Mechanical Alloying of Brittle Materials" by R. M. Davis, B. McDermott and C. C. Koch, Metallurgical Transactions A, 1988, Vol.19A, pp. 2867 to 2874 and "The Physics of Mechanical Alloying: A First Report" by D. R. Maurice and T. H. Courtney, Metallurgical Transactions A, 1990, Vol. 21A, pp. 289 to 303, deal with research in the physical aspects of mechanical alloying of hard and brittle materials. For industrial applications of mechanical alloying processes for brittle and hard materials, vibratory mills are less suited because the charges to be processed are too small. In this regard, so-called planetary mills offer better conditions. A planetary mill comprises a first disk (a so-called sun wheel) which is rotatingly driven. On the circumference of the sun wheel, a plurality of (smaller) likewise rotatable second disks (so-called planetary wheels) are rotatably supported. On the planetary wheels, grinding drums are arranged. Up to now, planetary mills of the above type have been used for the comminuting and dispersing of materials, wherein the materials to be processed, i.e. the grinding stock, are placed into the grinding drums together with freely floating grinding bodies (grinding balls). The commercially available planetary mills operate with fixed, unchangeable speed ratios between the grinding drum and the sun wheel and are not useful for the mechanical alloying of brittle and hard materials because the effect of the grinding bodies on the materials to be alloyed is insufficient. Although the article "Broyeurs á satellites" by Albert Joisel, Revue des matériaux de construction, Nr. 493, 1952 describes research directed to the energy input for the grinding bodies of a planetary mill, this research did not yet lead to consequences for the practical use of a planetary mill for mechanical alloying.

It is an object of the invention to provide a method and a device which are adapted for the mechanical alloying of brittle and hard materials by use of a planetary mill.

SUMMARY OF THE INVENTION

According to the invention, it is provided that, in a planetary mill, the angular speeds of the sun wheel and the planetary wheel are selected in dependence on the ratio between the inner radius of the grinding drum and the radius of the sun wheel in such a manner that, upon rotation of the sun wheel and the planetary wheel (grinding drum), the grinding bodies impinge on the brittle and hard materials with an energy sufficient for mechanically alloying these materials. The energy input is performed exclusively by the grinding bodies in the grinding drum of the planetary mill. The kinetic energy of the grinding bodies is transformed into a deformation of the grinding stock, i.e. into a deformation of the powdery or granular brittle and hard materials to be alloyed to each other. By the impact of the grinding bodies, the different materials are mechanically contacted with each other and thereby are mechanically alloyed to form a polycrystalline mixed crystal. Tests performed by the inventors have shown that (commercial) planetary mills can be employed for the mechanical alloying of brittle and hard materials if it is provided that the speed ratio or the angular speed ratio between the sun wheel and the planetary wheel is variably adjustable and is selected in dependence on the ratio between the inner radius r of the grinding drum and the radius R of the sun wheel for thus optimizing the energy input. In the present description and in the claims, the radius of the sun wheel or the radius R of the first disk is to be understood as the distance between the axis of rotation of the sun wheel and the axis of rotation of the planetary wheel, Thus, the radius of the sun wheel is the radius of the orbit on which the planetary wheel moves around the axis of rotation of the sun wheel. When, in the description and in the claims, mention is made of the inner radius of the grinding drum, the grinding bodies are assumed to be point-shaped, which, however, does not imply a restriction of the general scope of the invention. This means that the grinding bodies have no dimension and are defined merely by their masses.

When the grinding balls have a finite radius $\rho$, all of the statements herein remain valid if the inner radius r of the grinding drum is replaced by the difference $r-\rho$. In other words, the inner radius of the grinding drum is to be understood as the radius of the orbit described by the center of a grinding ball which upon rotation of the grinding drum bears against the internal wall of the drum.

When the speed or angular speed ratio is $+1$ or $-1$, as is the case in customary planetary mills, the grinding balls travel chaotically in all directions in the grinding drum while performing a large number of impacting movements. By changing the ratio between the rotational speeds in a planetary mill to a value which—as provided according to the invention—is dependent on the vessel size and the diameter of the sun wheel, the energy input per ball impact can be optimized. The impacting movements of the balls will then be reduced in numbers but be performed with increased energy. If the ratio between the rotational speeds is set to an optimum value, also brittle materials can be alloyed to each other in relatively large quantities. Thus, the energy input per grinding ball impact can be increased to values which also in case of brittle materials are sufficient for providing the minimum energy required for dissolving the lattice compounds. Brittle and hard materials in this sense are particularly those whose chemical bond is predominantly of a covalent or ionic nature. Materials of this type will split under pressure or shearing forces. The class of these materials includes particularly all element semiconductors such as GE, Si, diamond etc. or compound semiconductors such as PbTe, $Bi_2Te_3$, GaAs, InSb, $Hg_{1-x}Cd_xTe$ etc. or ionic crystals and crystalline connections such as common salt (NaCl).

Particularly, the invention can be used for producing semiconductors or semiconductor compounds with an electrically active dotation whose density lies above the thermodynamically allowable solubility limit. In this case, thus, the semiconductor or the semiconductor compound and the dopant are the two components to be alloyed to each other. For thermoelectric applications (thermogenerator materials), there exists a specific interest in doting the following semiconductor alloys beyond the above limit: Gi, Si, $Gi_{1-x}Si_x$, $Bi_2Te_3$, PbTe, $FeSi_2$, $Mg_2Si_{l-x}Ge_x$, MnSi, CoSi, NiSi. Further, according to the invention, the two element semiconductors germanium and silicon can be mechanically alloyed to each other under addition of gallium (Ga), resulting in a $Ge_{l-x}Si_x$ mixed crystal doted with gallium above the solubility limit. Finally, also the two element semiconductors germanium and silicon can be mechanically alloyed to each other under addition of phosphor (P), resulting in a $Ge_{1-x}Si_x$ mixed crystal doted with phosphor above the solubility limit.

To sum up, it can be stated that the planetary mill which according to the invention is provided with a variable ratio between the rotational speeds, is adapted for the alloying of mixed materials of which at least one component is a brittle and hard substance, i.e. a (crystalline) substance whose chemical bonds are predominantly of a covalent or ionic character, and for performing this alloying process in an effective manner.

Preferably, with the ratio between the inner radius of the grinding drum and the radius of the sun wheel being between 0.1 and 0.9, the ratio between the angular speeds of the sun wheel and the planetary wheel is selected to be between 3.3 and 1.7. In this regard, it is to be observed that the larger the ratio between the radii is, the smaller the ratio between the angular speeds has to be selected. Thus, when the ratio between the radii is 0.1, the corresponding ratio between the angular speeds is 3.3, and when the ratio between the radii is 0.9, the corresponding ratio between the angular speeds is 1.7.

Suitably, the angular speed ratio to be selected in a planetary mill is determined according to the following formula:

$$\omega = \frac{1}{a \cdot r + b} + c,$$

wherein
$\omega$ denotes the ratio between the angular speed of the grinding drum or the second disk and the angular speed $\Omega$ of the first disk,
r denotes the ratio between the inner radius r of the grinding drum and the radius R of the first disk,
a,b,c denote dimensionless constants with the values a=3.29, b=0.202 and c=1.368.

In the above formula, r is exactly equal to the inner radius of the grinding drum when the grinding bodies are considered to be point-shaped, i.e. have no dimensions and are defined only by their mass. For the finite diameter $\rho$ of the grinding balls, r is to be replaced by the difference $r-\rho$. Further, the influence of the grinding bodies onto each other has been left unconsidered in the above formula. The above equation indicates a phenomenological relation which reflects the exactly calculated ratios for practical use with an accuracy of 3.5%. The equation applies to opposite senses of rotation of the two disks. (Rotation of the two disks in the same sense can be disregarded because the energy input will be considerably lower in this case.)

With the calculations based on the above formula and provided in connection with the instant invention, it is possible for the first time to make quantitative statements on the energy inputs and thus on the usefulness of a planetary mill for the mechanical alloying of different materials.

Further research of the inventors has had the result that, merely by setting the angular ratio between the rotational speeds in dependence on the ratio of the radii, the energy input per grinding body can be increased by a plurality of orders of magnitudes (a plurality of decimal powers) as compared to the energy input of known planetary mills operating with fixed angular speed and radius ratios. Also in comparison with known vibratory mills, the invention makes it possible to increase the energy input by a factor in the range of 10 to 100.

BRIEF DESCRIPTION OF THE DRAWINGS

An embodiment of the invention will be described in greater detail with reference to the accompanying drawings

DESCRIPTION OF THE PREFERRED EMBODIMENTS

Figure 1:
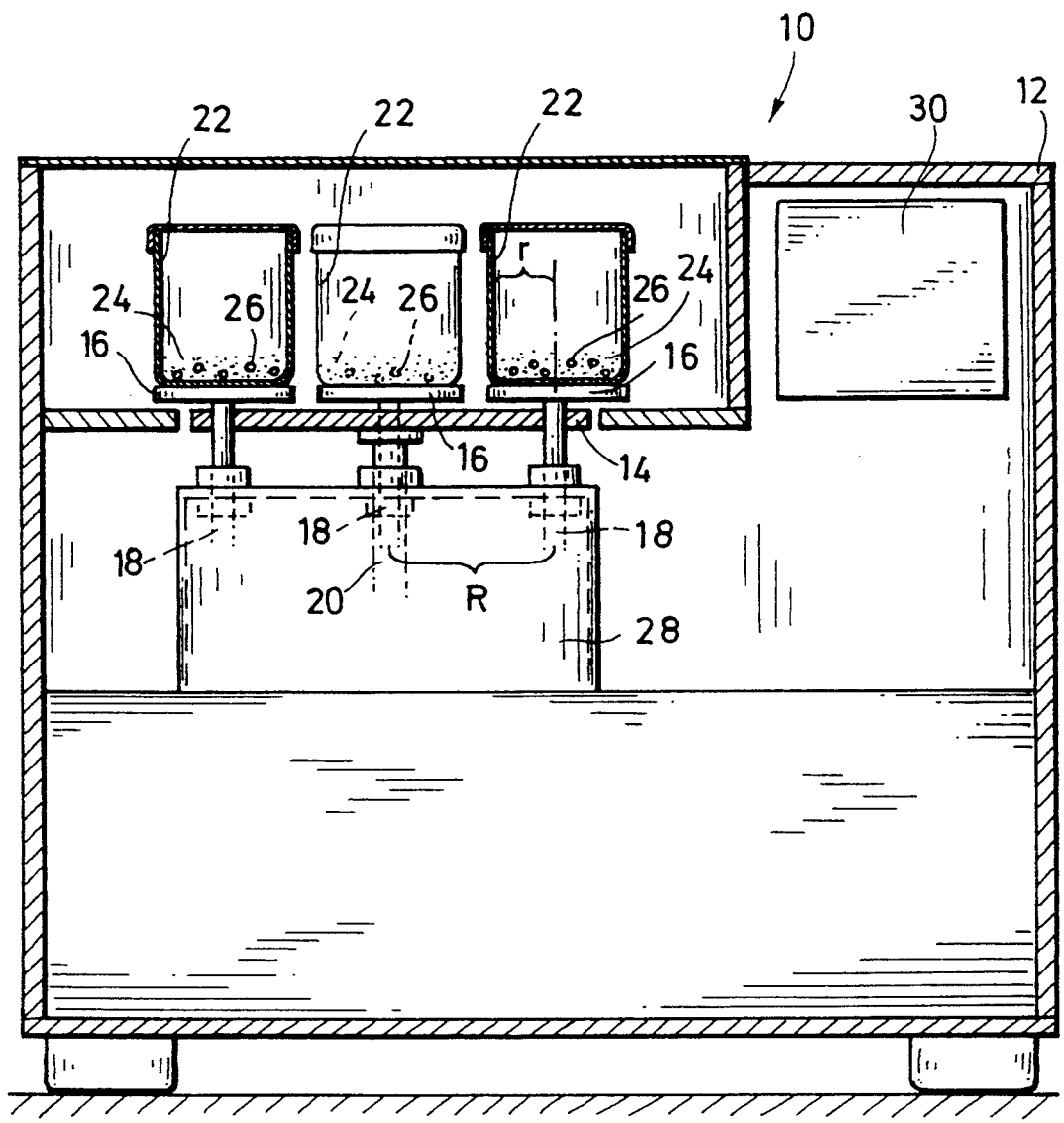
FIG. 1 is a highly schematic side view of a planetary mill for the mechanical alloying of brittle and hard materials.
Figure 2:
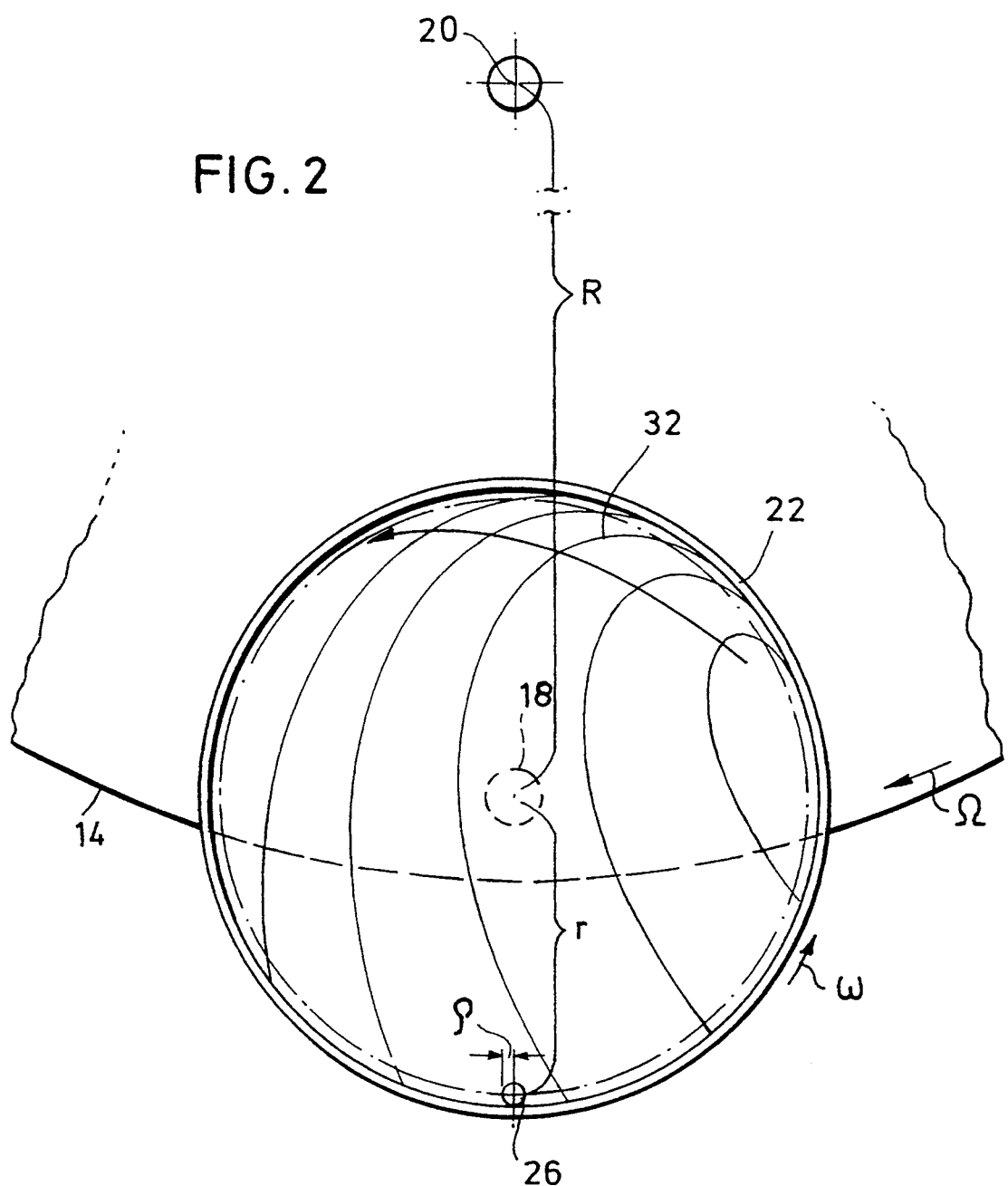
FIG. 2 is a highly schematic partial plan view of the sun wheel and a planetary wheel with a grinding drum for illustrating the flight path of a grinding body within the grinding drum with a fixed ratio between the radii and a variable ratio between the angular speeds.

FIG. 1 is a highly schematic side view of a planetary mill 10 having a housing 12. The planetary mill 10 is provided with a rotatably driven first disk 14 (also called a sun wheel hereunder). On the circumference of the sun wheel 14, a plurality of smaller, rotatable second disks 16 of smaller diameter (also called planetary wheels) are arranged. Also each of the planetary wheels 16 is adapted to be rotatably driven. The rotational axes 18 of the planetary wheels 16 extend in parallel to the rotational axis 20 of the sun wheel 14. The substantially horizontal planetary wheels 16 carry vessels 22 formed as grinding drums, which are closed and are clamped to the planetary wheels 16 for common rotation therewith. The grinding drums 22 contain granular or powdery matter, i.e. the above mentioned brittle and hard materials 24 to be mechanically alloyed to each other. Further, the grinding drums 22 contain the grinding bodies, illustrated at 26, provided in the form of grinding balls having a (finite) radius $\rho$ (FIG. 2). All of the axes of rotation 18,20 can be rotatably driven by a drive and gear unit illustrated at 28, with the rotational speed or the angular speed of the planetary wheels 16 and the angular speed of the sun wheel 14 being adjustable independently of each other. An operating panel, schematically illustrated at 30, can be used for manual input of operating data into planetary mill 10.

During rotation of the sun and planetary wheels 14,16, the brittle and hard materials 24 and the grinding balls 26 are subjected to centrifugal forces which have different strength and change periodically. Upon suitable selection of the angular speeds or suitable selection of the ratio between the angular speed of the planetary wheels 16 to that of the sun wheel 14, the grinding balls 26 will become detached from the inner surfaces of the grinding drums 22. The detached grinding balls 26 will then impinge again onto the inner surfaces of the grinding drums 22. Thus, the kinetic energy of the grinding balls 26 is transformed into a deformation energy for deforming the to-be-alloyed material particles at the impact point. Those grinding balls which in the reference system of the grinding drum impinge radially onto the material particles located on the inner surface of grinding drum 22, impart their kinetic energy in the most effective manner for deformation of the material particles. By use of the classical methods for calculating the flight path of a grinding ball within a grinding drum during rotation of a sun wheel and planetary wheels, it is possible to detect the optimum trajectory, i.e. the trajectory providing for the largest impact energy of the grinding ball when impinging onto the internal wall of the grinding drum.

FIG. 2 illustrates the family of trajectories will a ratio—determined by the size of a conventional planetary mill—between the inner radius r of grinding drum 22 and the radius R of sun wheel 14 in dependence on the set ratio between the angular speed $\omega$ of grinding drum 22 or planet wheel 16 and the angular speed $\Omega$ of sun wheel 14. The senses of rotation of grinding drum 22 and sun wheel 14 are selected to be opposite to each other. It be assumed that the radius of the sun wheel 14, i.e. the distance R between the rotational axis 20 of sun wheel 14 and the rotational axis 18 of planet wheel 16 or grinding drum 22 is 0.15 m. Further, it be assumed that the inner radius r of grinding drum 22 minus the radius $\rho$ of grinding ball 26, i.e. the radius of the orbit described by a grinding ball 26 abutting the grinding drum 22 upon rotation thereof, is 0.045 m. Thus, the resulting radius ratio will be r=r/R=0.3. For the to-be-selected ratio $\omega$ between the angular speed $\omega$ of grinding drum 22 or planet wheel 16 and the angular speed $\Omega$ of sun wheel 14, the following equation holds true with an accuracy of ±3.5%.

$$\omega = \omega/\Omega = \frac{1}{3.29 \cdot r/R + 0.202} + 1.368.$$

With the above formula, $\omega$ can be calculated as having the value 2.21. If, for instance, the sun wheel is rotated at a frequency of 300 rpm, i.e. at an angular speed $\Omega$ of 31.41 per second, the planetary wheel or the grinding drum have to rotate at an angular speed $\omega$ of 69.41 per second, which corresponds to a frequency of substantially 69.41 rpm. The flight path followed by a grinding ball 26 abutting inside on grinding drum 22 on the radial extension of the distance R between the two rotational axes 18 and 20, is shown at 32 in FIG. 2. Generally, when there is a constant radius ratio r=r/R=0.3 in the family of trajectories shown in FIG. 2, an increase of the absolute value for the speed ratio $\omega$ will cause a grinding ball 26 to fly through the grinding drum following an ever flatter flight path. The validity of these theoretical considerations can be demonstrated by the following two borderline situations. Assuming that the sun wheel 14 would rotate at an angular speed $\Omega\neq 0$ while the grinding drum 22 would stand still relative to the sun wheel 14 ($\omega=0$), this would lead to $\omega=0$. The grinding balls 26 would be subjected merely to the centrifugal forces generated by rotation of sun wheel 14 so that the grinding balls 26 would remain on the inner surface of grinding drum 22 on the radial extension of the distance between the rotational axes 18 and 20. Thus, relative movement of the grinding balls 26 with respect to grinding drum 22 would not take place. If, however, in the angular speed ratio $\omega,\omega$ would be very large or tending to infinity, i.e. if the angular speed $\omega$ of grinding drum 22 would be considerably larger than the angular speed $\Omega$ of sun wheel 14, the grinding balls 26 would likewise remain on the inner surface of grinding drum 22 but rotate along with it (although with a possible slippage). In case of large values for $\omega$, the centrifugal forces generated by rotation of grinding drum 22 would always be larger than the sum of the centrifugal forces generated by rotation of sun wheel 14 and the coriolis forces. Thus, as shown in FIG. 2, the grinding balls 26 would describe the "flight path" marked by the chain-dotted line, extending concentrically to grinding drum 22 and spaced from the inner surface thereof by the radius $\rho$ of grinding ball 26. Thus, it is evident that an increase of the angular speed ratio $\omega$ will make the flight path of a grinding ball 26 ever flatter until, finally, the flight path is determined by the curvature of the interior surface of grinding drum 22.

Two test examples of the mechanical alloying of germanium and silicon for obtaining a mixed crystal SiGe will be described hereunder, one of these examples (example 2) being performed by operating the planetary mill in the manner provided by the invention.

EXAMPLE 1

In the planetary mill 10, the speed ratio was set to be −1, the rotational frequency of the sun wheel 14 being $\Omega=300$ rpm and that of the planetary wheels 16 being $\omega=300$ rpm, with both wheels 14,16 rotating in opposite senses. The ratio r/R between the radii was 0.3, the diameter of sun wheel 14 being R=150 mm and the diameter of planetary wheels 16 being r=4.5 mm. Each of the grinding drums 22, having an inner diameter of 4.5 mm, was supplied with 20 g silicon and 16 g germanium (as a coarse-ground material with a particle size of 1 mm), corresponding to a molar ratio of 0.76 for Si and 0.24 for Ge.

First, the material to be ground was etched for 30 seconds in an etching solution comprising 45 vol % $HNO_3$ (65%), 27.5 vol % HF (40%), 27.5 vol % $CH_3COOH$ (99%) for removal of contamination. Then, in an oxygen-and water-free atmosphere, the material was filled into the grinding drum 20 together with 10 grinding balls (with a mass of 10.1 g each) and the drum was closed in an air-tight manner. The grinding drum 20 was mounted in the planetary mill 10 and screwed onto the planetary wheel 16.

The alloying process was monitored by producing X-ray diffractograms of the ground powder. After a grinding period of about 300 hours, no formation of alloy was observed yet in the X-ray diagram.

EXAMPLE 2

The specifications were the same as in Example 1 with the (sole) difference that, rotating the sun wheel 14 and the planetary wheel 16 in opposite senses, the speed ratio $\omega/\Omega$ was $-2$, with $\Omega=300$ rpm and $\omega=600$ rpm. (With a ratio between the radii of 0.38, this would be the correct setting for maximum impact energy). Using X-ray measurement, it was detected that, with the above setting of the mill, an alloy $Si_{0.76}Ge_{0.24}$ was forming already after a grinding period of about 20 hours. After 40 hours, the alloy was completely homogeneous.

We claim:

1. A method for mechanically alloying brittle and hard materials, comprising:
   providing a planetary mill having a rotatable first disk and at least one rotatable second disk arranged on the first disk, the first disk defining a radius,
   providing a grinding drum on the second disk, the grinding drum defining an inner radius,
   placing brittle and hard materials to be alloyed into the grinding drum,
   placing grinding bodies into the grinding drum,
   determining the ratio between the inner radius of the grinding drum and the radius of the first disk,
   rotating the first disk at a first angular speed and rotating the second disk at a second angular speed, the first and second angular speeds being selected based upon the ratio between the inner radius of the grinding drum and the radius of the first disk,
   whereby the grinding bodies impinge on the brittle and hard materials with an energy sufficient to mechanically alloy the brittle and hard materials.

2. The method of claim 1, wherein the inner radius of the grinding drum and the radius of the first disk define a ratio between 0.1 and 0.9, and wherein the second angular speed and the first angular speed define a ratio between 3.3 and 1.7.

3. The method of claim 2, wherein the inner radius of the grinding drum and the radius of the first disk define a ratio of 0.1, and wherein the second angular speed and the first angular speed define a ratio of 3.3.

4. The method of claim 2, wherein the inner radius of the grinding drum and the radius of the first disk define a ratio of 0.9, and wherein the second angular speed and the first angular speed define a ratio of 1.7.

5. The method of claim 1, wherein the ratio between the second angular speed and the first angular speed is defined by the equation:

$$\omega = \frac{1}{a \cdot r + b} + c,$$

wherein
   $\omega$ represents the ratio between the second angular speed and the first angular speed,
   $r$ represents the ratio between the radius of the grinding drum and the radius of the first disk, and
   a represents a dimensionless constant having a value substantially equal to 3.29, b represents a dimensionless constant having a value substantially equal to 0.202, and c represents a dimensionless constant having a value substantially equal to 1.368.

6. The method of claim 1, wherein the rotating step comprises the step of rotating the first disk in a first rotational direction and rotating the second disk in a second rotational direction.

7. The method of claim 1 comprising the step of selecting the brittle and hard materials to be alloyed from a group consisting of materials having covalent chemical bonds and materials having ionic chemical bonds.

8. The method of claim 7 comprising the step of selecting the brittle and hard materials to be alloyed from a group consisting of germanium and silicon.

* * * * *